(12) United States Patent
Jones et al.

(10) Patent No.: US 6,477,478 B1
(45) Date of Patent: Nov. 5, 2002

(54) METHOD AND APPARATUS FOR AUTOMOTIVE AND OTHER TESTING

(75) Inventors: Barbara L. Jones; Paul Smith, both of King's Lynn (GB)

(73) Assignee: Snap-on Equipment Limited, King's Lynn (GB)

(*) Notice: Subject to any disclaimer, the term of this patent is extended or adjusted under 35 U.S.C. 154(b) by 0 days.

(21) Appl. No.: 09/529,249

(22) PCT Filed: Aug. 27, 1999

(86) PCT No.: PCT/GB99/02683

§ 371 (c)(1),
(2), (4) Date: Jul. 10, 2000

(87) PCT Pub. No.: WO00/12992

PCT Pub. Date: Mar. 9, 2000

(30) Foreign Application Priority Data

Aug. 28, 1998 (GB) .............................................. 9818791

(51) Int. Cl.⁷ .............................................. G06F 11/32
(52) U.S. Cl. ...................................... 702/102; 714/100
(58) Field of Search ............................ 714/1, 47, 100, 714/25, 26, 46, 799; 340/500; 701/12, 29, 34; 702/33, 34, 35, 36, 57, 58, 59, 81, 105, 121; 324/500, 503, 512, 528, 772

(56) References Cited

U.S. PATENT DOCUMENTS

| | | | |
|---|---|---|---|
| 4,057,847 A | 11/1977 | Lowell et al. | |
| 4,423,378 A | 12/1983 | Marino et al. | |
| 4,546,309 A | * 10/1985 | Kang et al. | .................. 324/509 |
| 4,586,370 A | 5/1986 | Massender | |
| 4,694,408 A | 9/1987 | Zaleski | |
| 4,738,133 A | 4/1988 | Breckel et al. | |
| 4,901,025 A | 2/1990 | Hirano et al. | |
| 4,922,443 A | 5/1990 | Coetsier et al. | |
| 4,924,398 A | 5/1990 | Fujiwara | |
| 4,926,330 A | 5/1990 | Abe et al. | |
| 5,041,976 A | 8/1991 | Marko et al. | |
| 5,129,259 A | 7/1992 | View et al. | |
| 5,268,644 A | 12/1993 | Klassen et al. | |
| 5,442,553 A | 8/1995 | Parrilo | |
| 5,450,321 A | 9/1995 | Crane | |
| 5,479,347 A | 12/1995 | Oguro et al. | |
| 5,532,927 A | 7/1996 | Pink et al. | |
| 5,541,840 A | 7/1996 | Gurne et al. | |
| 5,555,498 A | 9/1996 | Berra et al. | |
| 5,574,355 A | 11/1996 | McShane et al. | |
| 5,602,733 A | 2/1997 | Rogers et al. | |
| 5,638,273 A | 6/1997 | Coiner et al. | |
| 5,646,865 A | 7/1997 | Alfaro et al. | |
| 5,657,224 A | 8/1997 | Lonn et al. | |
| 5,680,328 A | 10/1997 | Skorupski et al. | |
| 5,758,300 A | 5/1998 | Abe | |
| 5,781,125 A | 7/1998 | Godau et al. | |
| 5,790,977 A | 8/1998 | Ezekiel | |
| 5,828,969 A | 10/1998 | Chamney et al. | |
| 5,884,202 A | * 3/1999 | Arjomand | .................. 340/439 |
| 6,081,098 A | * 6/2000 | Bertness et al. | ............. 320/134 |
| 6,181,992 B1 | * 1/2001 | Gurne et al. | .................. 701/29 |

FOREIGN PATENT DOCUMENTS

| | | |
|---|---|---|
| EP | 0641138 | 11/2001 |
| GB | 1467551 | 3/1977 |
| GB | 2290631 | 11/1998 |

OTHER PUBLICATIONS

Patent Abstracts of Japan Publication No. 59122967, Jul. 16, 2984.

* cited by examiner

Primary Examiner—Marc S. Hoff
Assistant Examiner—Edward Raymond
(74) Attorney, Agent, or Firm—Seyfarth Shaw

(57) ABSTRACT

A method and apparatus for automotive testing comprises a base station and at least two handsets adapted to provide a testing function in at least two corresponding technically distinct areas. Embodiments employ Kelvin connectors and/or Hall effect probes and/or induction probes. System operation is effected by the simplest and minimum number of control commands.

22 Claims, 3 Drawing Sheets

METHOD AND APPARATUS FOR AUTOMOTIVE AND OTHER TESTING

BACKGROUND

This invention relates to a method and apparatus for automotive and other testing. Particularly, but not exclusively, the invention relates to such method and apparatus applicable to the roadside testing of automotive vehicles, and the corresponding testing of such vehicles in diagnostic and service-orientated functions. One particular practical application of the embodiments of the invention lies in the provision of a method and apparatus of particular utility for patrol personnel offering roadside assistance to automotive vehicle users.

The invention is likely to find utility in related non-automotive applications.

A particular practical problem in the field of fault diagnosis in automotive vehicles lies in providing a simple practical means whereby common faults in relation to basic automotive systems can be readily identified. Of course, computer-based total vehicle analysis systems are available for analysis purposes, and these are effective. However, such systems are usually dedicated to one specific vehicle model and are thus applicable only to that extremely narrow range of vehicles, and in any case are not suitable for roadside use.

Another problem which arises relates to the fact that many faults are intermittent in nature and are generally untraceable using current conventional equipment until the fault has become so bad that it is present at all times.

A further requirement is that methods and apparatus of this kind need to be readily used by a roadside assistance patrol person under adverse weather conditions, and under similarly adverse conditions so far as the state of maintenance of the vehicle to be tested is concerned, and having regard to the fact that many modern vehicles are constructed so as to be highly resistant to the ingress of rain, snow and automotive lubrication and other fluids, whereby it is relatively difficult to gain access to some at least of the operating systems of a vehicle, notably the starter system and related electrical components.

There is disclosed in U.S. Pat. No. 5,129,259 (View et al) a hand-held fault indicating system adapted to be coupled to the torque converter clutch solenoid of an automatic transmission by probe cables but which lacks disclosure of coupling means to a remote base station. U.S. Pat. No. 5,758,300 (Abe) and U.S. Pat. No. 5,657,224 (Lonn et al) disclose scanners adapted to be coupled to remote PC based diagnostic centres. U.S. Pat. No. 5,532,927 (Pink et al) discloses a diagnostic tool including a processor 16 which can be coupled to an on-board vehicle computer or ECU through an autotest device 44 or a breakout box 42, and which can also be coupled directly to different wiring harness connectors in the vehicle via a test probe. The disclosure does not indicate whether or not the device is hand-held. U.S. Pat. No. 4,057,847 (Lowell) discloses a remotely controlled test interface unit 12 provided with a transceiver for coupling to a data processing unit to be tested, and also coupled to a central processing system. The test interface unit 12 is portable, but apparently not hand-held (see paragraph bridging columns 6 and 7). U.S. Pat. No. 4,901,025 (Herano et al) discloses a fault diagnostic system including two different types of scanners 7, 29 respectively connectable to a vehicle connector, which is connected to plural on-board electronic devices. The scanners can not be simultaneously connected to the vehicle, nor is there provision for connecting them to a remote base station. U.S. Pat. No. 5,781,125 (Godau et al) discloses a portable transceiver 1 which can be mounted on a vehicle and communicates with a remote base station or diagnostic centre. The portable transceiver module 1 is apparently adapted to be coupled to an on-board ECU. Plural modules can be mounted on the vehicle simultaneously (FIG. 3), but this is for use during vehicle manufacture. U.S. 4,586,370 (Massemder) discloses a portable (but not hand-held) test unit for testing electrical and pneumatic systems on vehicular trailers. The system couples to the trailer harness which usually connects the trailer to the tractor, and also provides wireless connection to a hand-held remote control unit. U.S. Pat. No. 4,926,330 (Abe et al) discloses a scanner which, in addition to the standard connection to the on-board vehicle connector, is provided with a plug-in memory cartridge 34 which has probes 46 for coupling to specific vehicle circuits. None of these prior systems appears to disclose or suggest a method and apparatus adapted to provide identification of a range of two or more faults in technically distinct areas of a vehicle or the like electrical or electro-mechanical system by means of a single set of apparatus using dedicated portable handsets for the diagnostic function in the specific technical areas to be analysed.

SUMMARY

An object of the present invention is to provide a method and apparatus offering improvements in relation to one or more of the factors discussed above and/or improvements generally.

According to the invention there is provided a method of testing applicable to the identification of faults and to the making of other routine tests in automotive vehicles and like electrical and/or electromechanical and/or hydromechanical systems or assemblies or components. The invention also provides corresponding apparatus.

In an embodiment of the invention a method and apparatus for automotive testing provides a base station and at least two handsets associated therewith, the handsets being adapted to provide a diagnostic and/or performance-related analytical function in relation to at least two corresponding distinct technical areas of a vehicle. The at least two handsets transmit corresponding test data to the base station which carries out a processing function in relation thereto, which is directed towards enabling fault tracing and/or diagnosis and/or performance analysis in relation to the distinct technical areas assessed by the handsets. In this way, a single set of apparatus is able to provide a fault tracing and/or performance analysis function in two or more technical areas and on the basis of simple test routines which are relatively ideally suited to use by roadside assistance personnel confronted with a corresponding range of potentially technically unrelated faults.

Technical areas in relation to which handsets may be provided in a system according to the invention include the many aspects of electrical evaluation of automotive ignition and starter and control and monitoring and other systems, thermal evaluation of braking systems, surface evaluation of tires including treads and sidewalls, condition assessment of automotive starter batteries and many other functions.

In the embodiments of the invention, the base station may be connected to a computer which can provide additional analysis and data-comparison and data storage functionality to complement the functions of the base station.

In the embodiments of the invention, the use of a handset is to be understood to comprise mobile hand-held apparatus of the kind adapted to be conveniently carried and used manually by a user (usually on a single-handed basis) from place to place of use for convenient application or interaction with a system to be tested. An example of a handset of this kind is disclosed in FIG. 1 of our co-pending application PCT/GB98/01949 (our reference P53540WO). In the embodiment described below the handset is of a size for comfortable hand holding and for operation and control (by the user's thumb) using simple procedures and relatively few buttons with a one-line display or light-emitting diodes as a user interface. In its simplest form a handset is hand-held appartus.

In a first embodiment of the invention, electrical contact access to electrical parts is simplified by the use of clip connectors to battery terminals utilising a Kelvin connection to remove the degrading effects of dirty contacts. A temperature sensing device may also be incorporated. These system options enhance the accuracy of measurement and diagnosis.

The embodiments reduce the skill and time requirement exposed on the user.

BRIEF DESCRIPTION OF THE DRAWINGS

Embodiments of the invention will now be described by way of example with reference to the accompanying drawings in which.

DETAILED DESCRIPTION

Figure 1:
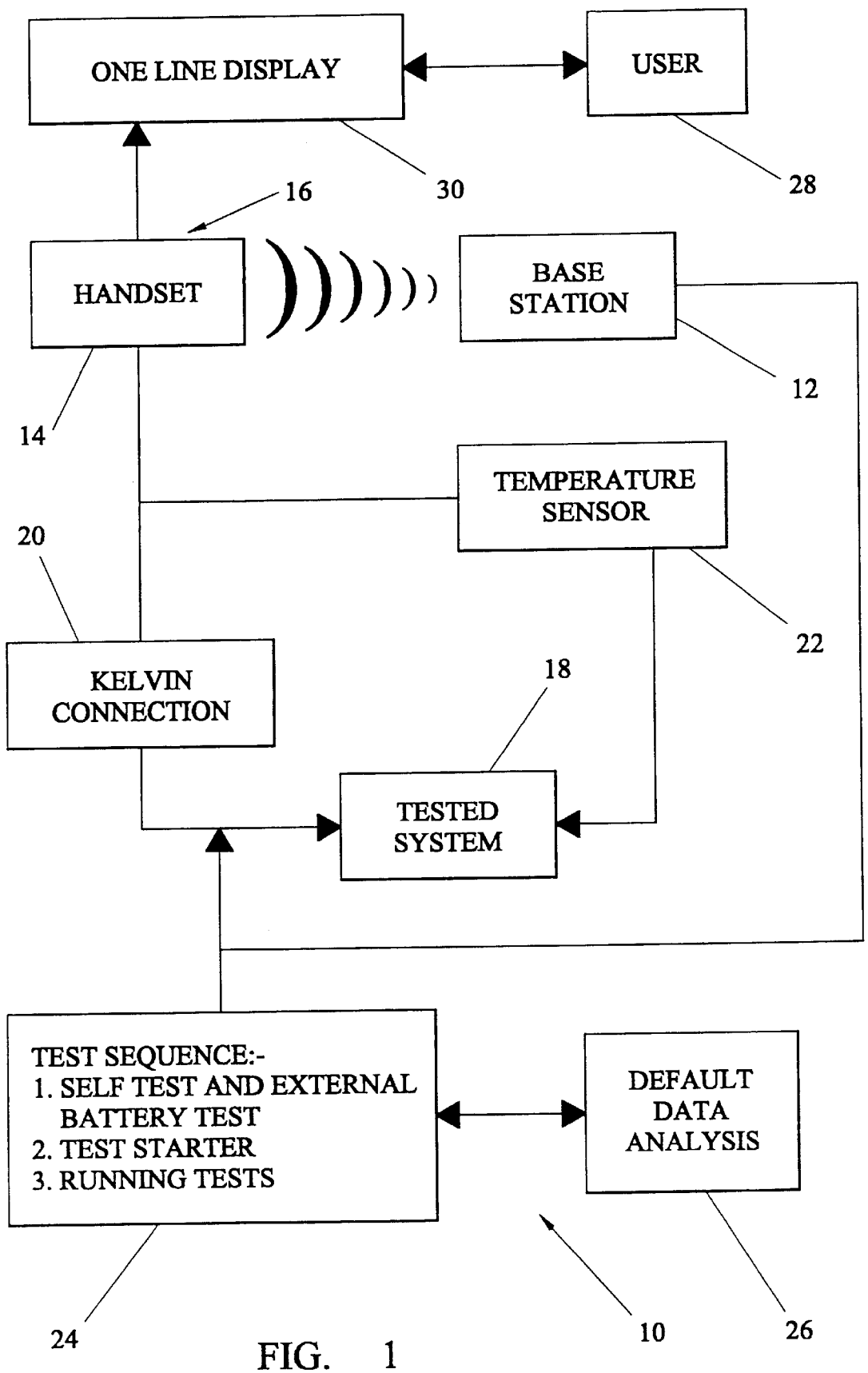
FIG. 1 shows in flow diagram/block diagram format a first embodiment of the invention in which the handset is applicable to battery and starter systems for automotive vehicles.

As shown in FIG. 1, a method of testing applicable to the identification of faults and to the making of other routine tests in automotive vehicles and like electrical and/or electro mechanical and/or hydro-mechanical systems employs the apparatus 10 shown in FIG. 1 which comprises a base station 12 and a handset 14 connectable to the base station for signal transmission purposes. Base station 12 incorporates its own power source for itself and for the hand set and signal transmission means 16 is provided for hand set 14 and is adapted to effect test signal transmission between the handset and a system or assembly or component 18 under test.

Handset 14 and/or base station 12 are adapted to effect processing of test signals sensed and/or generated by and/or induced by the signal transmission means 16 for fault identification and/or performance evaluation purposes.

Handset 14 is adapted also to carry out test procedures on or in the vicinity of the tested system 18 by interaction with that system under test through the signal transmission means 16. In this embodiment, the tested system is the starter system of an automotive vehicle including the starter battery and/or the starter and/or associated control and connections systems.

In this embodiment, handset 14 is connectable to tested system 18 through a Kelvin connection 20 and a temperature sensor 22.

Handset 14 is adapted to carry out a test sequence 24 under the control of base station 12 which provides a default data analysis function 26, through the handset whereby test data is categorised and/or otherwise evaluated to determine its significance.

In FIG. 1 there is shown the signal handset 14. However, it is to be understood that the system provided in one aspect of the invention offers the combination of base station 12 with at least two handsets 14 providing technically distinct analysis functions applicable to at least two corresponding technically distinct areas of evaluation of a vehicle, and base station 12 is adapted to process the corresponding two data streams provided by the handsets to identify characteristics providing identification means for fault-tracing and/or performance evaluation purposes. The second handset may offer any of the functions mentioned earlier, or indeed may be that of FIGS. 2 and 3 of the drawings.

Handset 14 provides its own interface with a user 28 through a one line display device 30 and/or corresponding light-emitting diode devices (not shown).

In use, handset 14 is connected to the terminals of the battery of tested system 18 and the test button on the handset is pressed.

Apparatus 10 then performs item 1 of test sequence 24, an internal self test and an external battery "sanity" check. Then, the apparatus tests the battery state of charge and the condition of the battery. For this purpose, the systems provided in handset 14 and base station 12 may be as described and illustrated in our presently (at the priority date of filing of this application) unpublished WO application number PCT/GB98/01634 dated Jun. 19 1998.

The information display at 30 informs user 28 whether the battery should be replaced or whether the battery should be capable of starting the car or whether the battery should simply be recharged.

In the case where the decision is to start the car, the ongoing test procedure comprises pressing the test button on handset 14 and activating the starter system of the vehicle. Handset 14, through Kelvin connection 20 then tests solenoid current, the rate of rise of solenoid current, the time for the solenoid to pull-in, initial starter current, starter motor ripple, and cranking current. This is item number 2 of test sequence 24.

The data from item 2 of the test sequence 24 is compared against the known characteristics of the vehicle by means of default data analysis 26 which operates on the basis of default data stored in the base station and accessed on the basis of user input of vehicle identification references. Accordingly, faults can be diagnosed and conclusions indicated in terms merely of "a good/faulty" indication, or more detailed information which is available from base station 12.

It will be understood that item 1 of test sequence 24 establishes the internal impedance of the battery of tested 18. Thus, the battery can subsequently be used as a measuring device. In other words the battery forms a shunt. Any current flowing in and out of the battery causes a small AC and DC variation at the terminals, which can be detected and timed. This variation is typically of the order of 1 to 2 volts when starting, and up to 0.5 vaults when charging from the alternator.

Apparatus 10 is therefore analogous to an intelligent oscilloscope. No set-up is required. Data is acquired and analysed against parameters stored as a default. Conditions at the terminals do not vary widely between vehicles, save under fault conditions.

The above very simple technique covers many component faults and can also provide an indication of some wiring faults. However, all wiring faults can not be detected by the simple apparatus described above. Likewise, the above apparatus of FIG. 1 does not immediately enable the user to distinguish an erroneous current drain when most of the electrical system is off, e.g., a gradual discharge due to a stuck relay or a damaged semiconductor. Accordingly, a facility to incorporate further functions is provided by means of plug-in accessories for handset 14 to enable it to offer more sophisticated testing functions, as described below with reference to FIGS. 2 and 3.

Figure 2:
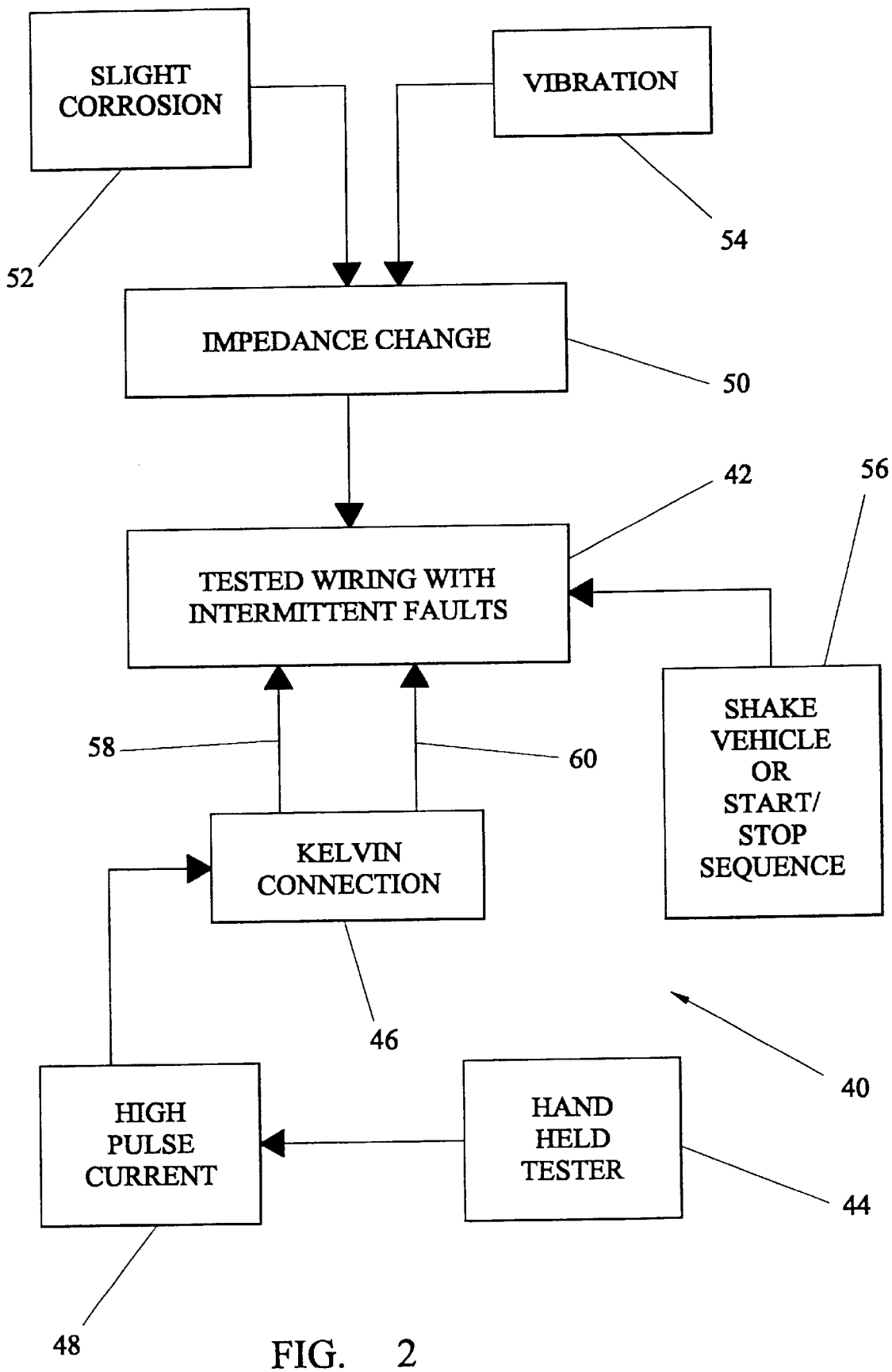
FIG. 2 shows, in similar diagrammatic format the use of a handset applicable to the testing of wiring with intermittent faults.

Turning to the embodiment of FIG. 2, this shows a modification of the handset/base station system of FIG. 1 in which the apparatus 40 is adapted for testing wiring 42 with intermittent faults in which the handset 44 operating as previously through a Kelvin connection 46 delivers a high pulse current 48 for detecting impedance changes 50, due, for example, to slight corrosion 52 and/or vibration effects. The test sequence of FIG. 2 includes, as shown at 56 shaking the vehicle and/or carrying out a start/stop sequence in relation to the starter system, if such is involved.

The embodiment of FIG. 2 is applicable principally to wiring 42 carrying relatively high current levels. This embodiment may not be directly applicable to breaks in wiring looms carrying low signal levels.

Whereas a definite and permanent break in conduction is often relatively easy to diagnose, a common and fairly easily developed fault is that in which some tens of milliohms is added to the circuit and produces a hot terminal. Such a condition may be due to a loose screw or connection. Usually, it results in the vehicle failing to start.

In the case of intermittent wiring faults 42, detection has hitherto been difficult leading to repeated requests for technical assistance by a vehicle user. Slight corrosion in connection systems can prevent vehicle starting in cold conditions or may reduce charging rates. Even more difficult to deal with is the impedance variation caused by vibration, or when an earth connection is inadvertently made through a bearing. Sometimes the vehicle starts easily. Other times it is dead.

The handheld tester 44 of FIG. 2 is used as a microohmeter, using high pulses currents 48. Such high currents overwhelm errors caused by small currents which may already be flowing for quite legitimate reasons, but which would certainly invalidate the result obtained by a normal electrical test system. Kelvin connection 46 provides the pair of connectors 58, 60. In addition, a third connector is provided from the battery to tester 44 to provide the energy for the high pulse current 48.

In this way an accurate and repeatable measurement of impedance can be made. The test sequence 56 then includes shaking the vehicle or starting and stopping the engine several times, with repetition of the measurement. Any significant variation in the measurement indicates an intermittent problem and its severity.

Figure 3:
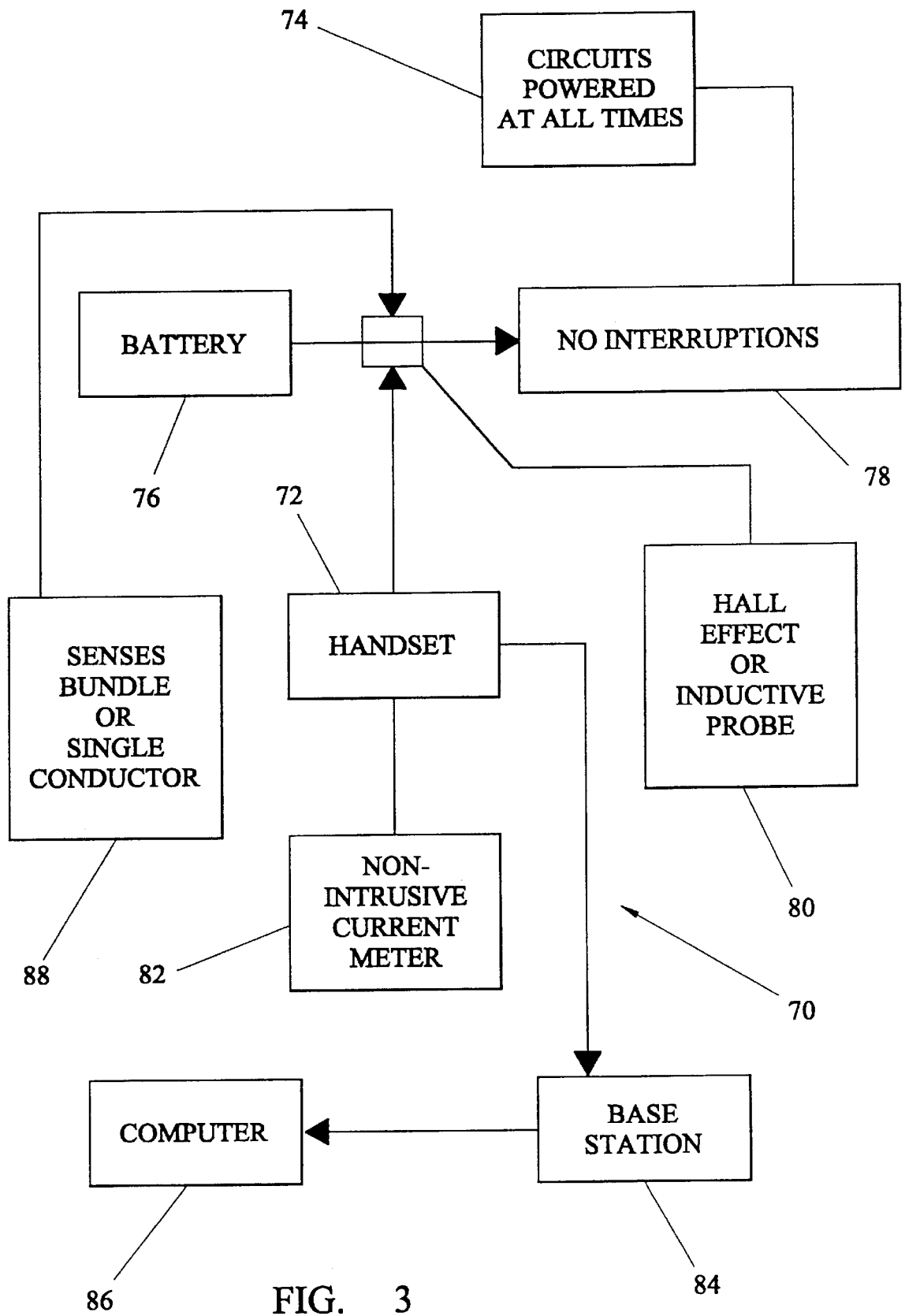
FIG. 3 shows an embodiment in which the handset is applicable to the testing of circuits which are powered at all times.

Turning now to the embodiment of FIG. 3, the apparatus 70 comprises a handset 72 adapted for the analysis of circuits 74 powered by a battery 76 at all times with no interruption 78.

For this purpose, handset 72 is provided with a hall-effect probe or an inductive probe 80 in order to provide a non-intrusive current metering effect 82 with the usual signal processing and analysis functions being provided by base station 84 which is linked to a computer 86.

Probe 80 is adapted to sense a bundle of wires or indeed a single conductor 88.

Looking now at the details of the functionality of the apparatus 70 of FIG. 3, the circuits 74 are of the kind provided in a modern vehicle in which a significant current drain from battery 76 is provided due to small amounts of electronics which are left powered at all times. If this current increases, the battery will be flat when the user returns, perhaps after a few days.

In this embodiment, the technical problem which is tackled concerns measuring an unacceptable current (meaning a slight increase in the normal current drain mentioned above) without interrupting the desired or necessary current. Vehicle manufacturers advise users not to remove the battery connection on many vehicles due to the potential loss of security codes. A non-intrusive current measuring device 82 is able to respond to this requirement.

As shown at 80 the Hall effect probe or inductive probe is provided having a circular or elliptical clamp with jaws which open to allow the probe to be placed round a wire.

Where a Hall effect probe is used, both DC and AC can be measured, but an inductive probe can only measure AC, unless an expensive flux-balancing technique is employed. Note however that Hall effect devices are subject to a degree of drift and are more expensive than inductive probes. For the present embodiment, a Hall effect device is preferred. Such a probe can be offered as an accessory to the previously described handsets whereby the latter can detect low levels of DC current while also being able to carry out the functions of the test device of FIG. 1.

Access to the wires under test is eased because any section of a wire may be used. Ideally, the wire of interest is separated from the remainder at some point. It is even possible to determine current in a bundle of wires, where the outward and return current is the same. Such a situation has hitherto been difficult to assess, but a deliberate imbalance in the magnetic coupling circuit can be used to ensure that at least some signal is coupled to the detector.

In this embodiment, base station 84 is used to store test data prior to down-loading to computer 86, thereby enabling the nature and frequency of faults to be assessed. In a modification, the base station may be used to store performance specification data pertaining to vehicles. This data may be down-loaded to the handheld tester 72 to more accurately define test parameters and limits, whereby the handset is customised to the vehicle under test.

In the multi-handset system disclosed in FIGS. 1 to 3, the base station operates in association with several handsets and enables collection of data which is useful for statistical purposes. The technical information contained in the base station removes the need for the user to carry and interpret vehicle specifications. The mode of use of the equipment requires little skill on the part of the user while detailed information can be displayed or stored for later use.

The level of fault finding made available will enable a mechanic quickly and confidently to diagnosis the most common automotive faults.

What is claimed is:

1. A method of testing applicable to the identification of faults and to making of other routine tests in automotive vehicles and like electrical and/or electro-mechanical and/or hydro-mechanical systems or assemblies or components, the method comprising :
   a) providing a base station and a handset connectable to said base station for signal transmission purposes;
   b) providing at least one power source for said base station and said handset, and signal transmission means for said handset adapted to effect test signal transmission between said handset and said system or assembly or component under test;
   c) said handset and/or said base station being adapted to effect processing of test signals sensed and/or generated by and/or induced in or by said signal transmission means for fault identification and/or performance evaluation purposes;

d) said handset being adapted to carry out test procedures on and in the vicinity of said system or assembly or component under test by interaction with said system or assembly or component under test through said signal transmission means;

characterised by e) said method being adapted to provide identification of a range of two or more faults in technically distinct areas by means of a single set of apparatus, at least two of said handsets being provided, each handset being adapted to provide a technically distinct analysis function applicable to at least two technically distinct areas of evaluation of the same or a different system or assembly or component under test, and each being adapted to provide its own technically distinct data stream to said base station through its signal transmission connection to said base station;

f) said base station being adapted to process said at least two technically distinct data streams provided from said at least two handsets to identify characteristics providing identification means for fault-tracing and/or performance evaluation purposes in said at least two technically distinct areas; and g) said method comprising employing said at least two handsets and said associated base station in sequence to provide said fault-tracing and/or performance evaluation on the same or different systems or assemblies or components in said at least two technically distinct areas by means of a single set of apparatus.

2. A method of testing characterised by providing at least two handsets each adapted to provide a technically distinct analysis function and a corresponding data stream to a base station which is adapted to process said data streams to identify characteristics providing identification means for fault-tracing and/or performance evaluation purposes, the method comprising employing the handsets to provide said functions in said technically distinct areas by means of a single set of apparatus.

3. A method according to claim 1 or claim 2 characterised by at least one of said handsets being adapted to effect battery evaluation and said method comprising the step of causing said at least one of said handsets to effect said battery evaluation by said signal transmission between the battery under test and said handset.

4. A method according to claim 1 or claim 2 characterised by at least one of said handsets being adapted to effect brake evaluation and said method comprising the step of causing said at least one of said handsets to effect said brake evaluation by said signal transmission between the brake or associated structure under test and said handset.

5. A method according to claim 1 or claim 2 characterised by said at least one of said handsets being adapted to effect battery and/or starter system evaluation, and said method comprising the step of employing a Kelvin connection to said battery and/or starter system.

6. A method according to claim 1 or claim 2 characterised by at least one of said handsets being adapted to effect electrical system evaluation and said method comprising the step of employing a temperature sensor to connect to said electrical system.

7. A method according to claim 1 or claim 2 characterised by the step of carrying out a test sequence comprising one or more tests selected from the group comprising self-testing and external battery testing and starter testing and vehicle running test.

8. A method according to claim 1 or claim 2 characterised by at least one of said handsets being adapted to effect tracing of intermittent wiring faults and said handset comprising a Kelvin connector to effect said test signal transmission between said handset and said system comprising a wiring fault, and the method comprising applying a high pulse current to said system to determine the presence of a resistance fault of the order of less than one ohm.

9. A method according to claim 1 or claim 2 characterised by at least one of said handsets being adapted to effect tracing of a fault in a circuit which is powered at all times, the method comprising employing a Hall effect probe or an induction probe to analyse current in one or more conductors of said circuit.

10. A method of testing applicable to the identification of faults and/or to the making of other routine tests in automotive vehicles and like electrical and/or electro-mechanical and/or hydro-mechanical systems or assemblies or components, the method comprising :

a) providing a handset and signal transmission means for said handset adapted to effect test signal transmission between said handset and a system or assembly or component under test;

b) said handset being adapted to effect processing of test signals sensed and/or generated and/or induced in or by said signal transmission means for fault identification and/or performance evaluation purposes;

c) said handset being adapted to carry out test procedures on and in the vicinity of said system or assembly or component under test by interaction with said system or assembly or component under test through said signal transmission means;

characterised by d) said handset being adapted to effect battery and/or starter system evaluation and the method comprising employing a Kelvin connection to said battery and/or starter system.

11. A method of testing applicable to the identification of faults and/or to the making of other routine tests in automotive vehicles and like electrical and/or electro-mechanical and/or hydro-mechanical systems or assemblies or components, the method comprising:

a) providing a handset and signal transmission means for said handset adapted to effect test signal transmission between said handset and a system or assembly or component under test;

b) said hand set being adapted to effect processing of test signals sensed and/or generated and/or induced in or by said signal transmission means for fault identification and/or performance evaluation purposes;

c) said handset being adapted to carry out test procedures on and in the vicinity of said system or assembly or component under test by interaction with said system or assembly or component under test through said signal transmission means;

characterised by d) said handset being adapted to effect tracing of intermittent wiring faults and said handset comprising a Kelvin connector to effect said test signal transmission between said handset and said system comprising a fault and the method comprising applying a high pulse current to said system to determine the presence of an impedance fault of relatively low value.

12. Apparatus for testing applicable to the identification of faults and to making of other routine tests in automotive vehicles and like electrical and/or electro-mechanical and/or hydro-mechanical systems or assemblies or components, the apparatus comprising:

a) a base station and a handset connectable to said base station for signal transmission purposes;

b) at least one power source for said base station and said handset, and signal transmission means for said handset adapted to effect test signal transmission between said handset and said system or assembly or component under test;

c) said handset and/or said base station being adapted to effect processing of test signals sensed and/or generated by and/or induced in or by said signal transmission means for fault identification and/or performance evaluation purposes;

d) said handset being adapted to carry out test procedures on and in the vicinity of said system or assembly or component under test by interaction with said system or assembly or component under test through said signal transmission means;

characterised by e) said apparatus being adapted to provide identification of a range of two or more faults in technically distinct areas by means of a single set of apparatus, at least two of said handsets being provided, each handset being adapted to provide a technically distinct analysis function applicable to at least two technically distinct areas of evaluation of the same or a different system or assembly or component under test, and each being adapted to provide its own technically distinct data stream to said base station through its signal transmission connection to said base station;

f) said base station being adapted to process said at least two technically distinct data streams provided from said at least two handsets to identify characteristics providing identification means for fault-tracing and/or performance evaluation purposes in said at least two technically distinct areas; and g) said apparatus being adapted to employ said at least two handsets and said associated base station in sequence to provide said fault-tracing and/or performance evaluation on the same or different systems or assemblies or components in said at least two technically distinct areas by means of a single set of apparatus.

13. Apparatus for testing characterised by at least two handsets each adapted to provide a technically distinct analysis function and a corresponding data stream to a base station which is adapted to process said data streams to identify characteristics providing identification means for fault-tracing and/or performance evaluation purposes, the apparatus being adapted to employ said handsets to provide said functions in said technically distinct areas by means of a single set of apparatus.

14. Apparatus according to claim 12 or claim 13 characterised by at least one of said handsets being adapted to effect battery evaluation and said apparatus being adapted to carry out the step of causing said at least one of said handsets to effect said battery evaluation by said signal transmission between the battery under test and said handset.

15. Apparatus according to claim 12 or claim 13 characterised by at least one of said handsets being adapted to effect brake evaluation and said apparatus being adapted to effect the step of causing said at least one of said handsets to effect said brake evaluation by said signal transmission between the brake or associated structure under test and said handset.

16. Apparatus according to claim 12 or claim 13 characterised by said at least one of said handsets being adapted to effect battery and/or starter system evaluation, and said apparatus comprising a Kelvin connection to connect to said battery and/or starter system.

17. Apparatus according to claim 12 or claim 13 characterised by at least one of said handsets being adapted to effect electrical system evaluation and said apparatus further comprising a temperature sensor to connect to said electrical system.

18. Apparatus according to claim 12 or claim 13 characterised by being adapted to carry out a test sequence comprising one or more tests selected from the group comprising self-testing and external battery testing and starter testing and vehicle running testing.

19. Apparatus according to claim 12 or claim 13 characterised by at least one of said handsets being adapted to effect tracing of intermittent wiring faults and said handset comprising a Kelvin connector to effect said test signal transmission between said handset and said system comprising a wiring fault, and the apparatus being adapted to applying a high pulse current to said system to determine the presence of a resistance fault of the order of less than one ohm.

20. Apparatus according to claim 12 or claim 13 characterised by at least one of said handsets being adapted to effect tracing of a fault in a circuit which is powered at all times, the apparatus comprising a Hall effect probe or an induction probe or an induction probe and being adapted to analyse current in one or more conductors of said circuit.

21. Apparatus for testing applicable to the identification of faults and/or to the making of other routine tests in automotive vehicles and like electrical and/or electro-mechanical and/or hydro-mechanical systems or assemblies or components, the apparatus comprising:

a) a handset and signal transmission means for said handset adapted to effect test signal transmission between said handset and a system or assembly or component under test;

b) said handset being adapted to effect processing of test signals sensed and/or generated and/or induced in or by said signal transmission means for fault identification and/or performance evaluation purposes;

c) said handset being adapted to carry out test procedures on and in the vicinity of said system or assembly or component under test by interaction with said system or assembly or component under test through said signal transmission means;

characterised by d) said handset being adapted to effect battery and/or starter system evaluation and the method comprising employing a Kelvin connection to said battery and/or starter system.

22. Apparatus for testing applicable to the identification of faults and/or to the making of other routine tests in automotive vehicles and like electrical and/or electromechanical and/or hydro-mechanical systems or assemblies or components, the apparatus comprising:

a) a handset and signal transmission means for said handset adapted to effect test signal transmission between said handset and a system or assembly or component under test;

b) said handset being adapted to effect processing of test signals sensed and/or generated and/or induced in or by said signal transmission means for fault identification and/or performance evaluation purposes;

c) said handset being adapted to carry out test procedures on and in the vicinity of said system or assembly or component under test by interaction with said system or assembly or component under test trough said signal transmission means;

characterised by d) said handset being adapted to effect tracing of intermittent wiring faults and said handset comprising a Kelvin connector to effect said test signal transmission between said handset and said system comprising a fault and the apparatus being adapted to apply a high pulse current to said system to determine the presence of an impedance fault of relatively low value.

\* \* \* \* \*